Figure 8:
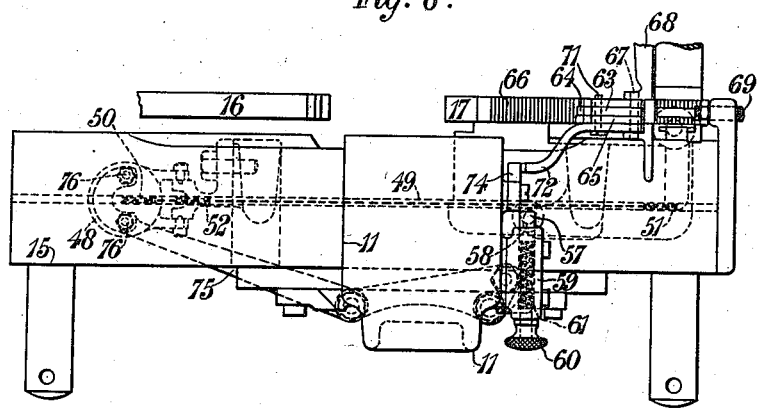

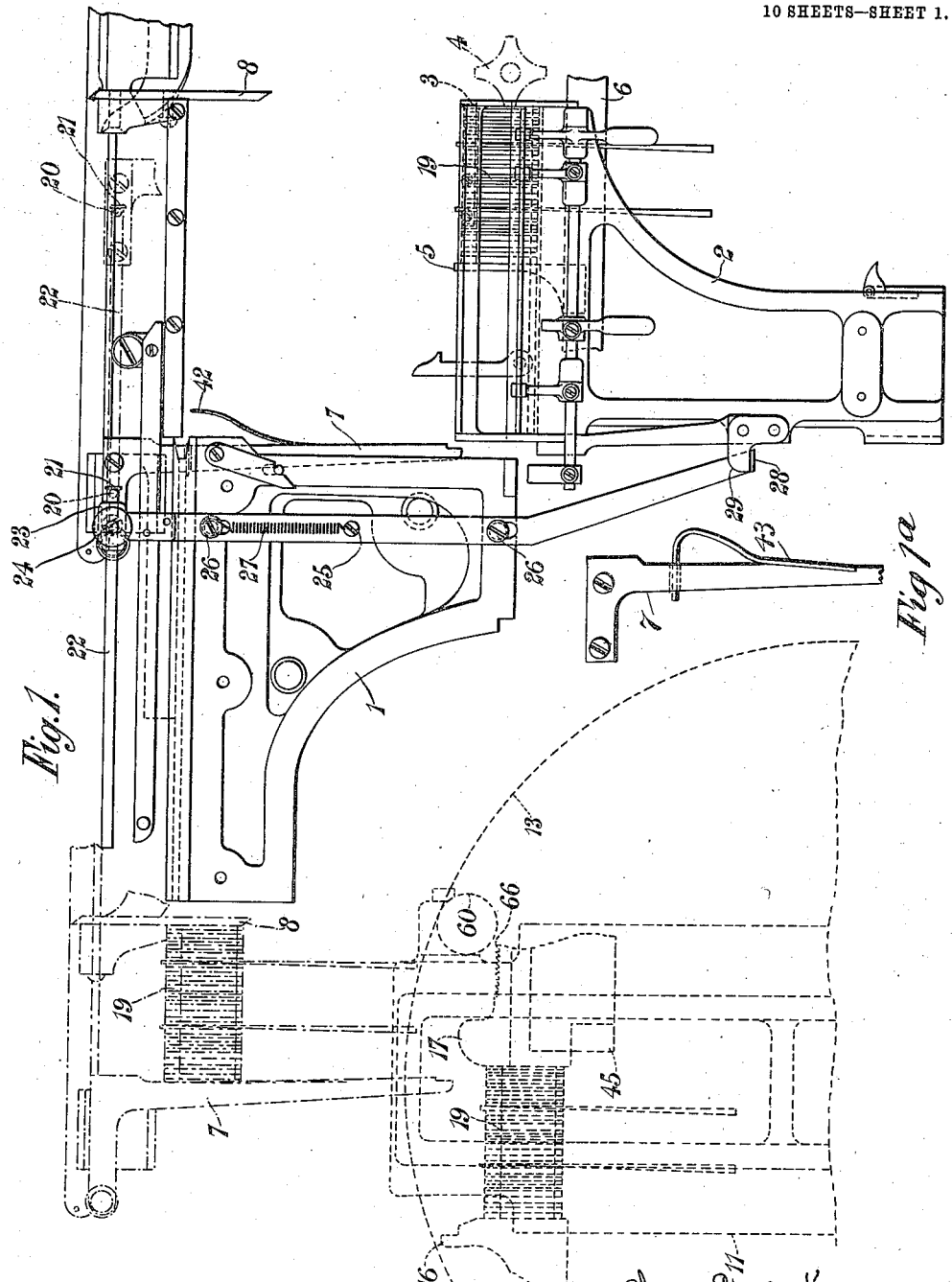

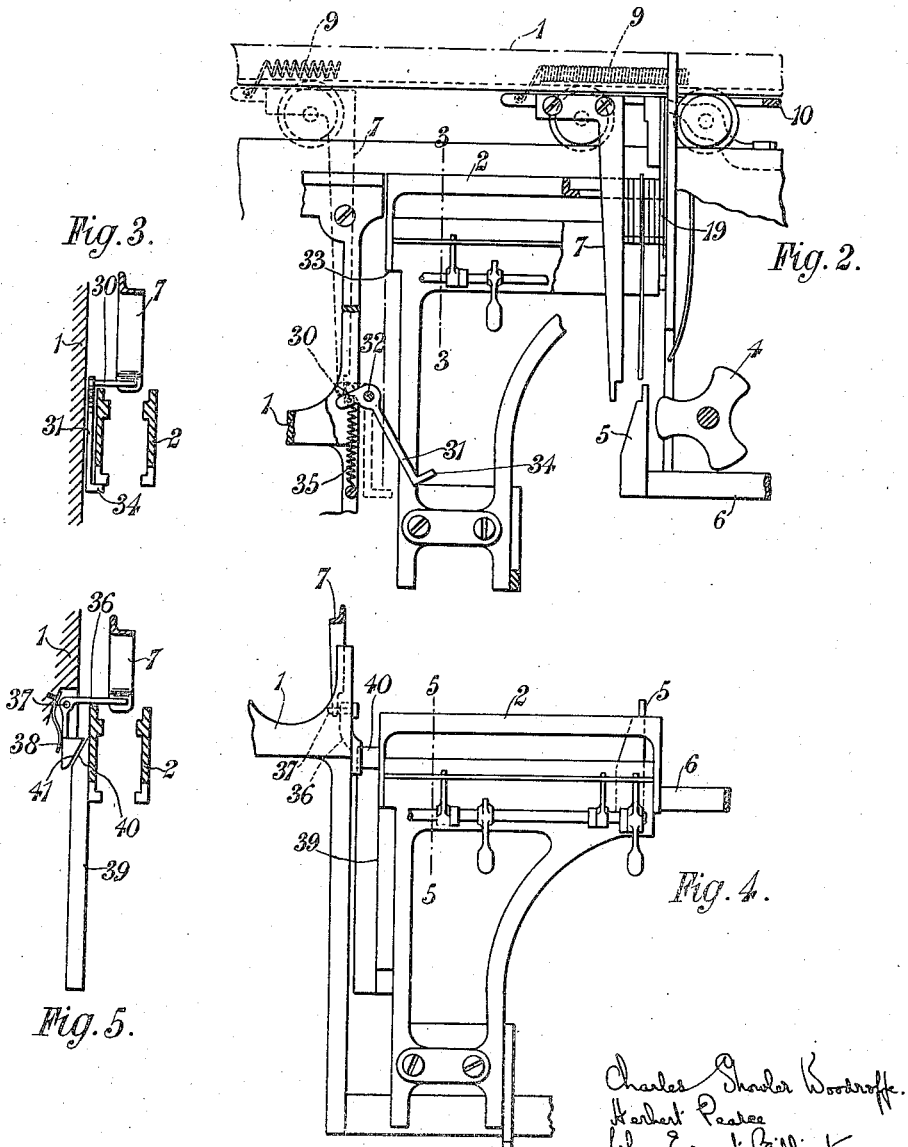

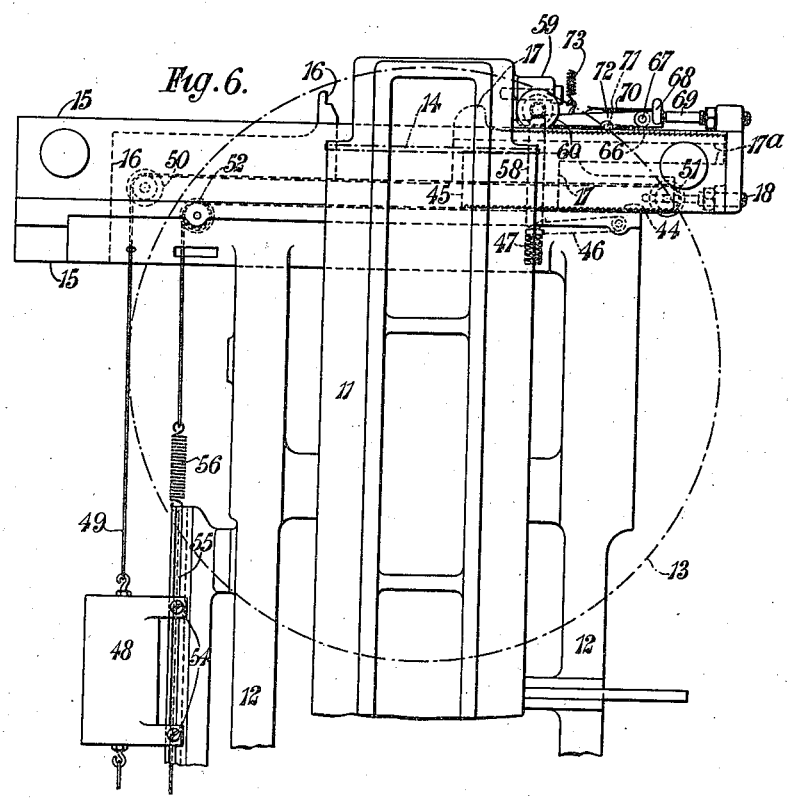

C. S. WOODROFFE, H. PEARCE & J. E. BILLINGTON.
QUADDING APPARATUS OF TYPOGRAPHICAL COMPOSING MACHINES.
APPLICATION FILED NOV. 23, 1907.

945,892.

Patented Jan. 11, 1910.

10 SHEETS—SHEET 4.

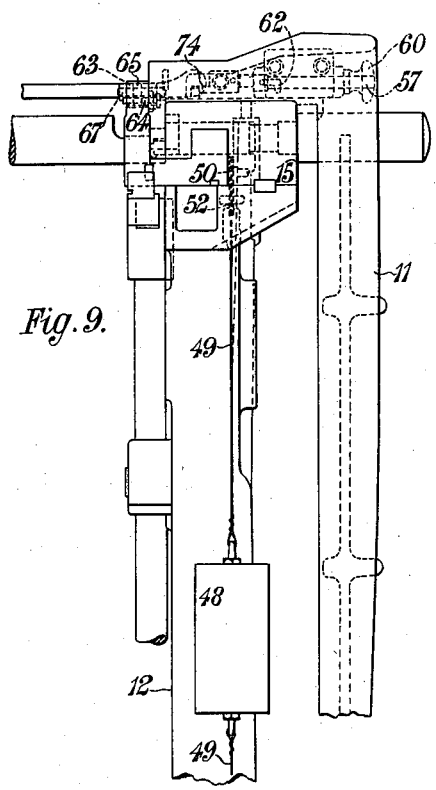

C. S. WOODROFFE, H. PEARCE & J. E. BILLINGTON.
QUADDING APPARATUS OF TYPOGRAPHICAL COMPOSING MACHINES.
APPLICATION FILED NOV. 23, 1907.

945,892.

Patented Jan. 11, 1910.
10 SHEETS—SHEET 6.

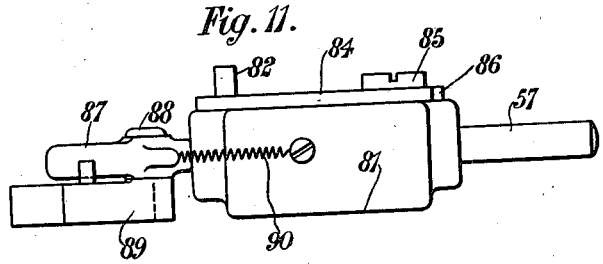
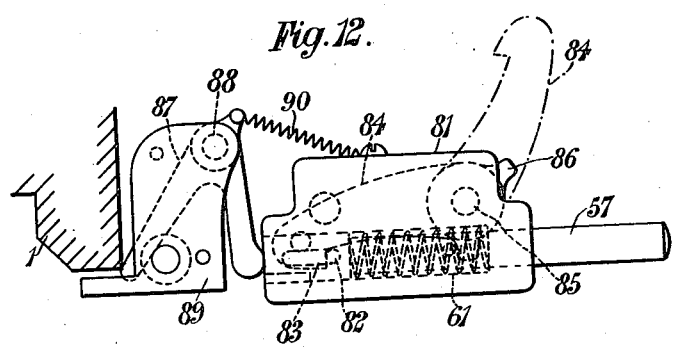
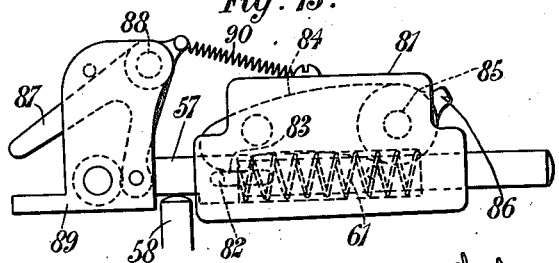

C. S. WOODROFFE, H. PEARCE & J. E. BILLINGTON.
QUADDING APPARATUS OF TYPOGRAPHICAL COMPOSING MACHINES.
APPLICATION FILED NOV. 23, 1907.

945,892.

Patented Jan. 11, 1910.
10 SHEETS—SHEET 8.

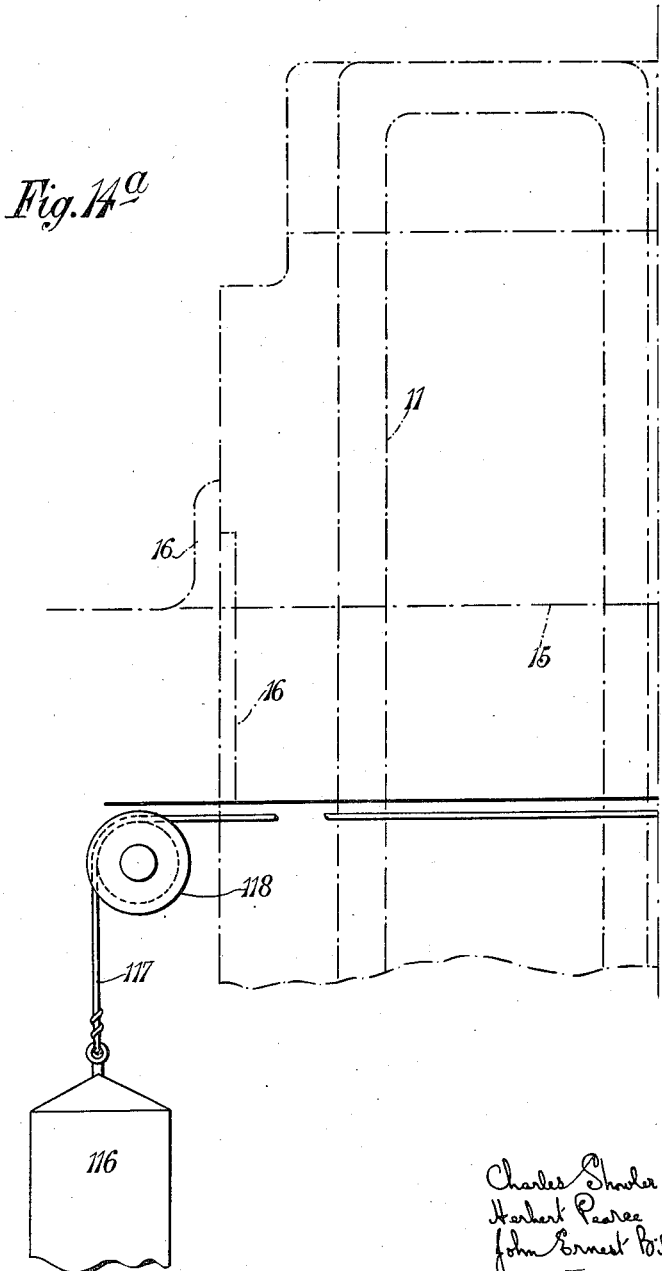

C. S. WOODROFFE, H. PEARCE & J. E. BILLINGTON.
QUADDING APPARATUS OF TYPOGRAPHICAL COMPOSING MACHINES.
APPLICATION FILED NOV. 23, 1907.
945,892.
Patented Jan. 11, 1910.
10 SHEETS—SHEET 10.
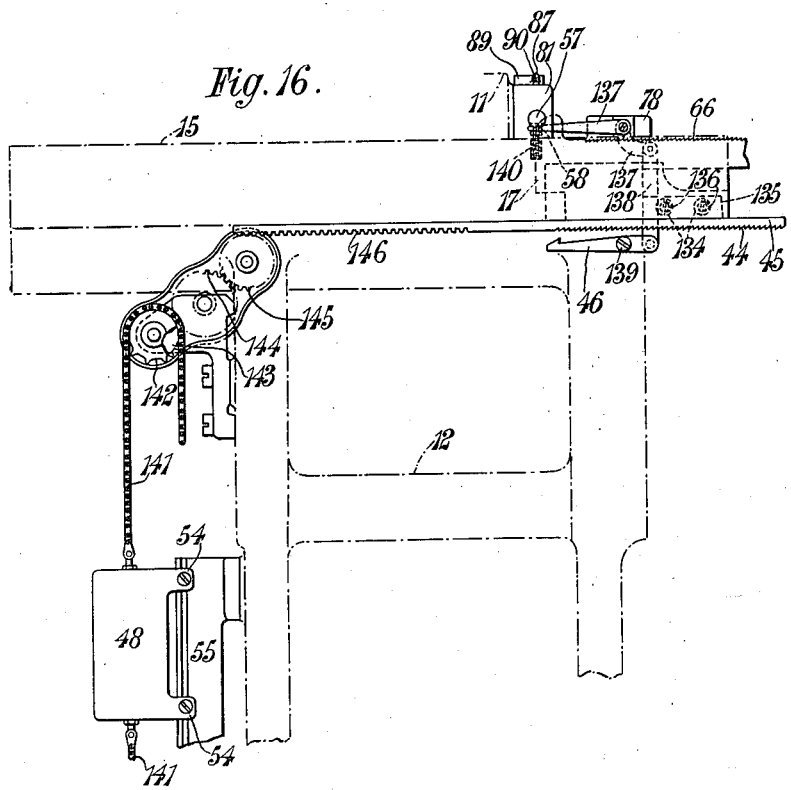

UNITED STATES PATENT OFFICE.

CHARLES SHOWLER WOODROFFE, OF LONDON, AND HERBERT PEARCE AND JOHN ERNEST BILLINGTON, OF BROADHEATH, ENGLAND, ASSIGNORS TO LINOTYPE AND MACHINERY LIMITED, OF LONDON, ENGLAND, A REGISTERED COMPANY.

QUADDING APPARATUS OF TYPOGRAPHICAL COMPOSING-MACHINES.

945,892.

Specification of Letters Patent. Patented Jan. 11, 1910.

Application filed November 23, 1907. Serial No. 403,549.

*To all whom it may concern:*

Be it known that we, CHARLES SHOWLER WOODROFFE, residing at 188 Fleet street, in the city of London, England, and HERBERT PEARCE and JOHN ERNEST BILLINGTON, both residing at the Linotype and Machinery Works, Broadheath, in the county of Chester, England, all subjects of the King of the United Kingdom of Great Britain and Ireland, have invented new and useful Improvements in the Quadding Apparatus of Typographical Composing - Machines, of which the following is a specification.

The present invention relates to improvements in the quadding apparatus of typographical composing machines, more especially in the quadding apparatus described in the specification of Letters Patent 608155. That apparatus was invented for use in and is described in connection with the linotype machine described in the specification of Letters Patent 436532. In this machine the mold for the body of the linotype is a horizontal slot in a mold block on the mold carrier, that for the printing edge of the linotype being provided by the assembled line of elements or matrices and space bars. This line is held against the body mold by a vise consisting of two jaws between which the line is wedged tight by the thickening of each of the space bars. The body mold is of the same length as the line, so that the latter covers and closes the body mold on that side of it, the opposite side of it being open to receive type metal which is injected into it by a pump. If the line to be assembled happened to be a short one such as so frequently occurs at the end of a paragraph, the operator was obliged, unless his machine was fitted with the quadding apparatus of Patent 608155, to make the short line up to full length by assembling a sufficient number of quads, otherwise the line would not have been long enough to close the mold. The assembling of each quad necessitated a depression of the quad key on the keyboard and therefore occupied time for which there was nothing to show in the printing edge of the linotype. The last mentioned patent relieved him of the necessity of so assembling quads by making the right hand vise jaw— the one that contacts with the end of a line— movable, so that the depression of a special key should be followed by the automatic movement of this jaw toward its fellow jaw far enough to embrace the short line between them. The mechanism of this patent is now known in the art as a quadding apparatus or "quadder". The present invention has been invented for use in the same machine and is particularly adapted for use therein although it is not necessarily restricted thereto. But because of that particular adaptability, its construction for and use in the said machine have been chosen for illustration and specification. It follows Patent 608155 in having the vise jaw that contacts with the end of a line, movable, but is characterized by certain improvements which are duly specified herein and claimed.

Before proceeding with the specification of such construction and use, it will be well to premise that the matrices and space bars—these being the elements which the said machine composes or assembles into lines— enter a horizontally positioned organ known as the assembler elevator through the open right hand end of it, one by one; that they are pushed along the said elevator toward the left by the last element assembled; that the elevator then assuming the function of a line-carriage, is raised vertically till it places the line assembled in it within the grasp of the line-shifter; that the line-shifter is then moved horizontally to the left till it delivers the said line into the first elevator; that the latter then moves vertically downward to place the line between the jaws of a vise where it is justified by having all its space bars thickened until it is wedged by them tightly between the said jaws; that the casting apparatus has a slot to serve as a mold for the body of the linotype, the only part of the complete mold which the asembled line contributes, being that for the printing edge of the linotype; that these two—slot and part—register with each other to form the complete mold; that the linotype is then cast; that the vise is then opened as much as it had been previously closed; and that, lastly, the said first elevator with the line in it, is raised vertically to deliver the line to the distributing mechanism.

Figure 7:
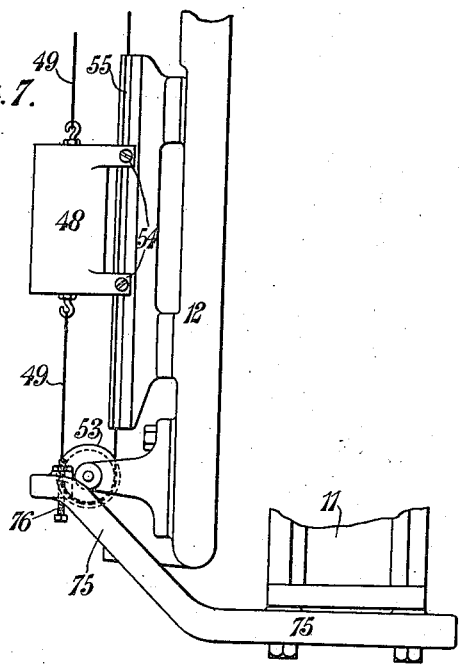
Figure 10:
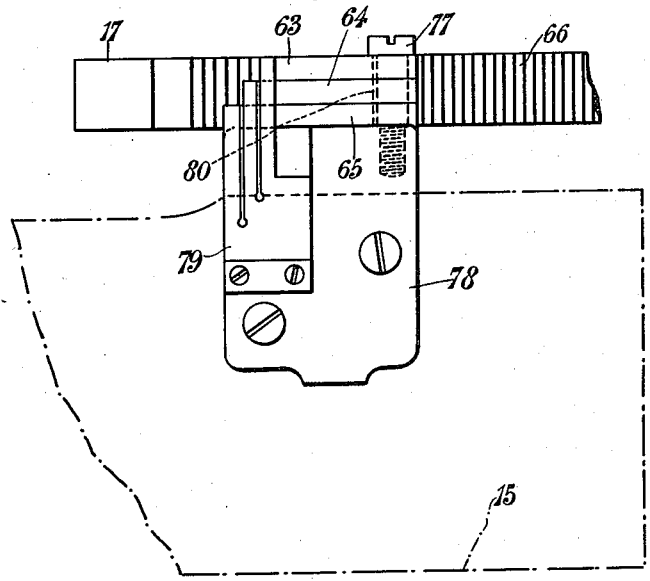
Figure 14:
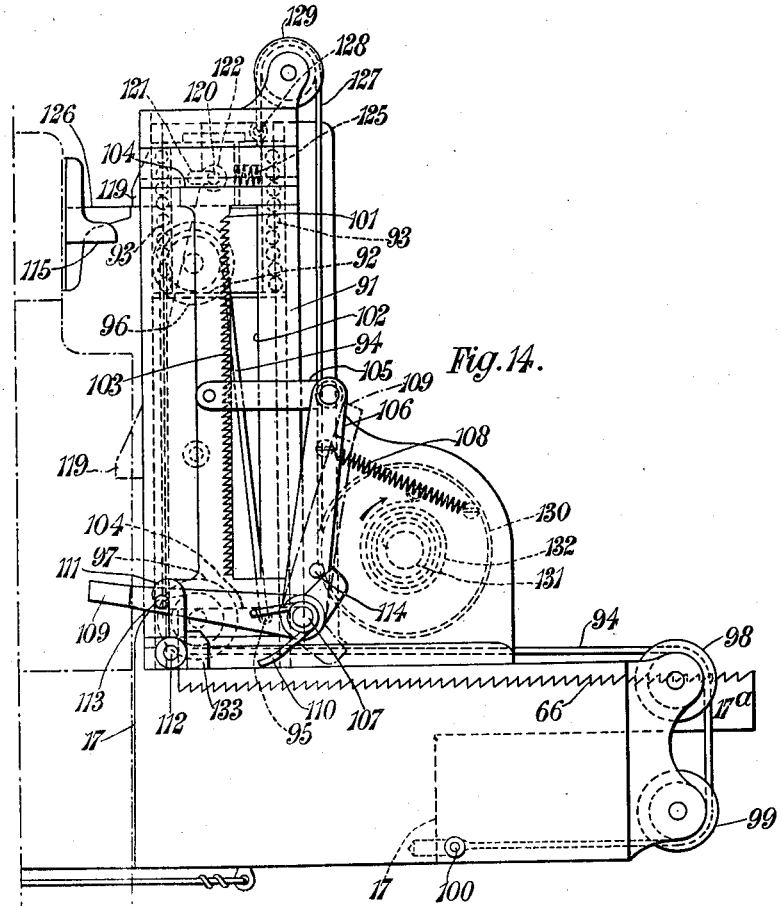
Figure 15:
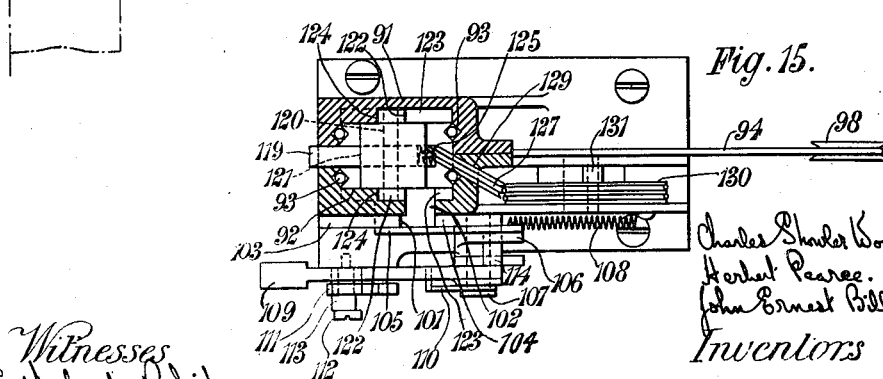

Referring to the accompanying drawings:—Figure 1 is a front elevation, the full lines showing the assembler elevator in the assembling position with a short line in it ready for being raised toward the line-shifter; the dot and dash lines showing the same line-shifter with the same line in it in position to coöperate with the first elevator, and the dotted lines showing the same line in the casting position: Fig. 1ª is a front elevation or edge view of a modified form of the spring bar 42 seen in Fig. 1. Fig. 2, a front elevation of an alternative means for enabling the assembler elevator to release the left hand finger of the line-shifter from the position in which it is set by the operator for normal lines: Fig. 3, a section on the line 3—3 of Fig. 2, assuming the assembler elevator to be in the assembling position: Fig. 4, a front elevation of a second alternative means for enabling the assembler elevator to release the left hand finger of the line-shifter: Fig. 5, a section on the line 5—5 of Fig. 4: Fig. 6, a front elevation of the vise frame and quadding apparatus, omitting the lower portion of the first elevator and showing the quadding jaw in quadding position: Fig. 7, a front elevation of the said lower portion: Fig. 8, a plan corresponding with Fig. 6: Fig. 9, a side elevation from the left hand of Fig. 6: Fig. 10, a detail plan of a modification in the method of mounting the pawls that lock the quadding jaw in the quadding position: Fig. 11, a plan, and Figs. 12 and 13, side elevations from the left hand, of a modified device for putting the quadder into and out of action: Fig. 14, the right hand portion, and Fig. 14ª the left hand portion of a front elevation, and Fig. 15, a sectional plan, illustrating alternative means for working the quadding jaw, the vise being open; and Fig. 16, a front elevation of certain modifications in the corresponding parts of Fig. 6.

1, 1 are parts of the machine frame; 2, the assembler elevator; 3, the detaining pawls at its entrance mouth; 4, the star wheel; 5, the line resistant fast on the left hand end of the assembler slide 6, and which is moved from the entrance mouth of the elevator 2 to the left by the first element of the line being assembled; 7, the left hand and 8, the right hand finger of the line-shifter that receives the assembled line from the elevator 2 and is then moved by a lever not shown in the figures, to the left with the line in its grasp, to deliver it into the elevator next mentioned. each finger being mounted on its own slide so that each can move in both directions independently of the other, the finger 7 being returned to its original position by a spring 9—Fig. 2—pulling on its slide 10 from a fixed point on the frame 1, and the finger 8 by the said lever; 11, the first elevator capable of a vertical motion in both directions in suitable guides in the vise frame 12 which is hinged by its bottom to the machine frame in order that it may be swung down to the front to expose the front face of the mold carrier 13 and of the mold slot 14 in the mold block on it (not shown) and also the rear face of the vise frame 12; 15, the vise top fast on the vise frame 12; 16, the left hand vise jaw and 17 the right hand vise jaw (known as the quadding jaw) both carried by the vise top 15, the jaw 17 capable of being moved along the said top 15 toward and away from the jaw 16 for the purpose of quadding. The rear faces of the two jaws 16 and 17 are in the same vertical plane and the front face of the mold slot 14 is in a plane parallel therewith, so that when the mold carrier 13 is moved forward into the casting position, the ends of the mold block bear metal-tight against the respective jaws.

18—Fig. 6—is a stop against which the jaw 17 abuts when a normal line, i. e., of full measure, is to be placed between the said two jaws. The operation of quadding consists in unlocking the quadding jaw 17, moving it from its normal position toward the jaw 16 until the short line is clamped between them, holding the jaw 17 locked in that (or quadding) position until after the quadded linotype has been cast, unlocking it, returning it to its normal position and locking it therein.

The foregoing organs, functions and relationships are the same as heretofore, subject only to the improvements hereinafter claimed.

The elements of the line being assembled, are driven through the mouth of the assembler elevator 2 and past the pawls 3 by the star wheel 4, the first element of the line pushing the line-resistant 5 before it. At one time, it was the practice to have the shifter finger 7 up to the finger 8 and in contact by its bottom end with the top of the resistant 5 so that the latter pushed the said finger 7 before it to the left, thereby separating it from its fellow finger 8 by a distance equal to the measure of the assembled line, no matter how long or short that might be. This practice was abandoned because it threw all of the work of moving the finger 7 to the left, upon the star wheel 4. It was replaced by an arrangement by which the operator could set the finger 7 at the full measure distance from its fellow finger 8, before he began assembling. But it is obvious that a short line 19, i. e., one that needs quadding, stands at the moment when the act of assembling it is complete, between the star wheel 4 and the line-resistant 5, the latter being then somewhere midway of the two ends of the assembler elevator 2 and at an important distance from the finger 7. Consequently when the assembler elevator rises to present the line 19 between the fingers of the line-shifter, not only will the latter be too wide to grasp it, but the leading elements of the line will fall off their feet to the left, as soon as the line is clear of the line-resistant 5. Automatic means are provided by which the finger 7, duly set at a distance from its fellow finger 8 equal to the measure of a full line, is released by the rising elevator 2 from that setting and pulled by its returning spring 9 up to the leading element of the line before it has a chance of falling off its foot. These means are illustrated in Fig. 1.

20 is a stud projecting from the head of the finger 7; 21, a shifter finger stop projecting from the right hand end of a rod 22 and engaging with the stud 20 so as to prevent the finger 7 moving to the right under the pull of its returning spring; 23, a socket through which the rod 22 can be moved lengthwise in either direction; 24, a set screw for holding the rod 22 in any desired position in the socket 23; 25, a bar sliding vertically in either direction on guides 26, 26, on the machine frame 1 and having the socket 23 fast on its top; 27, a spring constantly urging the bar 25 upward; 28, a foot on the bottom end of the bar 25; and 29, a lug on the adjacent side of the assembler elevator 2. The bar 25 is so proportioned and the lug 29 so positioned, that when the elevator 2 is in the assembling position, the lug 29 stands over the foot 28, thereby holding the bar 25 down against the resilience of its spring 27, and the finger 21 in detaining engagement with the stud 20.

The object of the longitudinal adjustment of the rod 22 by the set screw 24 in the crosshead 23, is to allow the operator to set the finger 7 at the full measure distance from its fellow finger 8. It is substantially the arrangement for this purpose already mentioned and *per se* forms no part of the present invention.

The action of the means just described is as follows. As soon as the elevator 2 begins to rise, the lug 29 frees the bar 25 and the spring 27 pulls the latter upward, thereby lifting and disengaging the stop 21 from the stud 20 on the finger 7. The latter is thereupon pulled by its returning spring, to the right up to the leading element of the rising line 19 which it engages before that element has cleared the resistant 5.

An alternative means is illustrated in Figs. 2 and 3. 30 is a pin projecting rearwardly from the top of a bell crank lever 31 fulcrumed at 32 on the frame 1. When the elevator 2 is in the assembling position, this pin stands immediately to the right hand of the bottom end of the latter and intersects the path thereof thereby preventing the latter from moving to the right under the pull of its returning spring. A shoulder 33 on the left hand side of the elevator 2 engages a foot 34 on the lever 31 when it—the elevator—is in the assembling position and thereby makes the said lever hold the pin 30 in retaining engagement with the finger 7 against the resilience of a spring 25 which pulls on the top of the said lever from a fixed point on the machine frame 1, as indicated by the dotted lines in Fig. 2. The arrangement of the parts is such that as the assembler elevator 2 returns into the assembling position from presenting an assembled line of any length—normal or short—between the fingers 7, 8 of the shifter (and this return is effected while the shifter is still coöperating with the first elevator 11), the shoulder 33 engages the foot 34 and rocks the bell crank lever 31 from the full line position in both Figs. 2 and 3, into the dotted one in Fig. 2 against the resilience of the spring 35, thereby placing the pin 30 in the path of the finger 7 which is accordingly stopped by it as the returning spring 9 is returning its slide 10 and it. As soon as the elevator 2 rises with a short line 19 in it, the spring 35 pulls the pin 30 out of the path of the finger 7, whereupon the latter is pulled up to the line 19 by its spring 9, as shown by the full lines in Fig. 2.

A second alternative means is illustrated in Figs. 4 and 5. 36 is a bell crank lever fulcrumed at 37 on the machine frame 1 and having a horizontal arm to serve as the stop for the finger 7; 38, a spring holding the said stop in detaining engagement with the finger 7; 39, a tail fast on the elevator 2; 40, a cam on the top end of the tail 39; 41, a second cam on the bottom end of the lever 36, the parts being so proportioned and positioned that so long as the elevator 2 is in the assembling position, it holds the cam 40 just to the rear and clear of the cam 41, so that the spring 38 holds the finger stop 36 in detaining engagement with the finger 7, as shown best in Fig. 5; but as soon as the said elevator begins to rise, it rocks the said stop 36 downward out of the path of the finger 7 which is thereupon pulled by its spring 9 up to the line 19, the tail 39 being long enough to keep the finger stop below the path of the finger 7 until after the latter has passed the said stop on its way to coöperate with the first elevator 11, and short enough to clear the cam 41 as the elevator 2 returns to the assembling position, in time for the spring 38 to return the finger stop 36 into its operative position before the finger 7 is returned by its spring 9. If the line 19 is a very short one, there is a risk of its first element clearing the resistant 5 before the finger 7 can engage it.

To prevent such an accident, the said finger—see Fig. 1—carries a spring bar 42 which projects flamboyantly from it toward the finger 8. 43 Fig. 1ª is a substitute form of bar. It is fast by its bottom end to the finger 7, carried from that point toward the finger 8, bent backward toward the finger 7 and passed through it. Either form of bar enables the finger 7 to present a light, curved and yielding support into the upward path of the line 19 as it rises, and one which will be in time to catch and support, with some part of its surface, a leading element that may be falling off its foot by reason of its having cleared the resistant 5 before the finger 7 can engage it.

The above mentioned specification 608155, shows the quadding jaw as of the same length at it was in the machine of Patent 436532. Consequently it cannot quad a very short line when the mold slot 14 is a long one, say 30 ems long, because then the jaw is not long enough to close metal-tight as much of the slot as the line leaves unclosed. The jaw 17 is long enough, by reason of the prolongation 17ª shown in Fig. 6, when it is in contact with its fellow jaw 16, to cover the whole of the mold slot 14. According to the present invention, 44—Fig. 6—is a rack on the bottom face of the jaw 17, or on the bottom face of a bar 45 fast to it and therefore incorporated with it, the teeth of the said rack pointing to jaw 16. 46 is a pawl pivoted on the vise frame 12 and adapted to be held by a spring 47 in engagement with some one tooth on the rack 44 to lock the jaw 17 in its normal position. The quadding jaw 17 is unlocked by disengaging the pawl 46 from the rack 44. This disengagement is effected by a projection 57—Fig. 8—carried by the top of the elevator 11 and which engages the top of a push pin 58 vertically mounted in the vise top 15 and normally standing up above it with its bottom end resting on the pawl 46, the spring 47 being strong enough to support and raise the pin 58 as well as to reengage the pawl 46 with the rack. The projection 57 is so situated on the elevator 11 that the disengagement of the pawl 46 takes place just before the elevator 11 has moved into its lowest position, i. e., after the said elevator has begun to place the short line 19 between the jaws 16, 17, and just before it is in casting register with the mold slot 14. But all lines do not require quadding, and for that reason, the operator must be enabled to put the quadder into or out of action. Accordingly, the present invention gives him the control of the engagement of the projection 57 with the pin 58, so that such engagement shall not take place when the line in the elevator 11 does not require quadding, and shall take place when it does. To this end, the projection 57 is the nose of a bolt adapted to slide from front to rear in a socket 59 under the projecting action of a spring 61 and to be pulled to the front again and locked in that position by a bayonet joint 62—Fig. 9. The operator pulls the bolt 57 to the front and locks it whenever the line in the elevator 11 is a normal one and does not therefore require quadding. If on the other hand, it is a short one and does therefore require quadding, he unlocks the joint 62 and the spring 61 puts the nose of the bolt 57 into the proper position for engaging the pin 58.

The jaw 17 is moved from its normal or full measure position toward the jaw 16 until the short line 19 is clamped between them, i. e., into quadding position, by the following means—Figs. 6 to 8. 48 is a weight falling freely to impart the quadding movement to the jaw 17. This weight is advantageously situated on the left hand side of the vise frame 12. It is connected to the jaw 17 by a cord 49 which being fast by one end to the top of the weight 48, is led upward over a pulley 50 journaled in the vise top 15, from there to the jaw 17 (or to the bar 45) to which it is made fast, thence to the right to and around a pulley 51 likewise journaled in the vise top 15, thence toward and over a third pulley 52 in the top 15, and from there downward and around a fourth pulley 53 journaled on the first elevator 11 near the foot of it and finally upward to the bottom of the weight 48 where it is made fast. The weight 48 is therefore capable of a vertical movement in both directions corresponding with the respective longitudinal movement of the jaw 17. It has lugs 54, 54, engaging in a vertical groove 55 in the vise frame 12 to prevent it—the weight—sagging forward when the said frame (to which the parts 11 and 48 to 55 are connected) is swung down to the front. 56 is a spring in a suitable position in the length of the cord 47 to prevent the necessity of very fine adjustment of the said cord or of the parts connected with it.

The jaw 17 is locked in quadding position against the well-known wedging action exerted by the space bars in the line 19 as it is being justified, by the engagement of a set of, say three, pawls 63, 64, 65—Figs. 8 and 9—, with a rack 66 on the top of the said jaw. This rack 66 extends for nearly the full length of the jaw 17, its teeth pointing to the right. The pawls 63, 64, 65, are pivoted on a suitably supported and practically stationary pin 67 and extend to the left to abut against the vertical faces of the respective rack teeth. The pin 67 is shown as carried by the well known pump stop lever 68 which has to be moved by the justification of any line—short or normal—for a short distance up to the stop 69 as heretofore. The pawls 63, 64, 65, are of different lengths so that if none of them is actually abutting against a tooth, the jaw 17 cannot be moved to the right for a distance greater than the third of a tooth before one does so abut, and are kept in engagement with the rack 66 for as long as the jaw 17 is to be held locked against the above-mentioned wedging action, either by springs 70—Fig. 6—fixed to the said jaw or by their own weight. They are raised out of engagement with the rack 66 to allow of the jaw 17 being returned to its normal position, and kept out of engagement by a pin 71 which is held under them between their noses and their pivot pin 67, by a lever 72 fulcrumed on the said pivot pin and normally held up by a spring 73. This being so, provision must be made to put the pin 71 out of action when the line in the elevator 11 is to be quadded. This provision—Fig. 8—takes the form of a projection 74 positioned on the elevator 11 to engage the lever 72 so as to put the pin 71 out of action just before the jaw 17 must be locked in the quadding position.

The jaw 17 must be returned up to the stop 18, i. e., into its normal position, after each quadded linotype has been cast. This return is effected by raising the weight 48 and therefore pulling the cord 49 in the reverse direction. The weight is raised by an arm 75 projecting from the bottom end of the elevator 11 and fitted with an adjustment 76 to make it begin to raise the weight at the proper moment. The cord 49 is practically an endless one having the weight 48 fixed at a suitable point in its length and also having two bights in it, one around the pulley 51—the one to the side of the jaw 17 opposite to the weight and the other bight around the pulley 53—the one on the arm 75 that moves down to pay out cord as the weight pulls the jaw and moves up to reverse the said jaw and lift the weight to pay out cord. During the time which elapses between the commencement of the rise of the elevator 11 to deliver the line in it to the distributing mechanism, and the engagement of the arm 75 with the weight 48, the latter is tending to pull the jaw 17 to the left. If it were allowed to do so, the said jaw would strike and injure those portions of any space bars in the line, which hang below their accompanying matrices before the said elevator had raised them above the jaw 17. Such pulling forward is prevented by the rapid reëngagement of the pawl 46 with the rack 44 and which reëngagement takes place before the said matrices are above the said jaw.

The set of pawls 63, 64, 65, that lock the quadding jaw 17 in quadding position, are shown in Fig. 8 and described therewith as being pivoted on a pin 67 that is carried by the pump stop lever 68. A better method of mounting them is shown in Fig. 10. According to it, they are pivoted on a headed pin 77 screwed into a block 78 fixed upon the vise top 15. The springs 70 are replaced by a three-tongued comb spring 79 fixed upon the block 78, so as to press the noses of the pawls down into engagement with the rack 66. The advantage of this method is as follows. The mold carrier 13 is supported by a slide (not included in the drawings because it does not form any part of the present invention) which the operator sometimes wants to draw to the front as far as it will come. To gain access to it for this purpose, he pulls down the vise frame 12. When the said pawls are mounted on the lever 68, they are likely to be in the way of the said slide, but when they are mounted on the vise top 15, the vise frame 12 carries them out of the way. The jaw 17 must have a slight movement to and from the right hand to coöperate with the pump stop in the well known way, and which motion, per se is quite independent of the present invention. According to the latter, this movement is provided for by horizontally slotting the hole 80 in the jaw through which the pin 77 is passed.

The modification shown in Figs. 11, 12 and 13, of the means for enabling the operator to control the engagement of the projection or bolt 57 with the pin 58, consists of a socket 81 fast, like the socket 59, on the elevator 11; the bolt 57; its protruding spring 61; a pin 82 projecting from the bolt 57 through and beyond a horizontal slot 83 in the socket; a rearwardly projecting gravity latch 84 pivoted on the side of the socket 81 and adapted to latch the bolt 57 forward and clear of the push pin 58, by engaging behind the projecting portion of the pin 82 as shown in Fig. 11; 85, its pivot; 86, a frontward projection by which the operator can disengage the latch 84 from the pin 82 when the line in the elevator 11 is to be quadded; bell crank lever 87 fulcrumed at 88 on a block 89 fast on the side of the elevator 11 and which block may be shaped to also discharge the function of the projection 74 already described and to so replace it, the front arm of this lever being held in contact with the rear end of the bolt 57 and the rear arm projected to the rear beyond the block 89, by a spring 90, so that the said rear arm shall come in contact with a conveniently situated fixed portion 1 of the machine frame as shown in Fig. 12, whereby the bolt 57 will be slid forward and latched clear of the push pin 58 by the latch 84. The use and action of this modification are as follows. Seeing that there are more normal lines than short lines in the majority of takes of copy, the operator keeps the latch 84 engaged behind the pin 82. When the line in the elevator 11 is to be quadded, he depresses the projection 86 far enough to unlatch the bolt 57 which forthwith has its rear end projected by the spring 61 over the pin 58 with which it engages in the way and with the effect already described. The projection of the bolt 57 makes the bell crank lever 87 throw its rear arm to the rear so as to be engaged and rocked forward when the rise of the elevator 11 after the quadded linotype has been cast, brings the said rear arm into contact with the above mentioned portion 1 of the machine frame, whereby the front arm of the said lever 87 will push the bolt 57 to the front until the pin 82 is in front of the nose of the latch 84 which thereupon drops behind it and locks the said bolt clear of the push pin 58. The nose of the latch 84 is beveled so that the pin 82 can raise it as it is pushed to the front. This provides automatically for the non-quadding of the next line. If a series of lines is to be quadded, the projection 86 is depressed far enough to throw the latch 84 past its pivot 85 to the front—Fig. 12—so that it cannot latch the bolt 57 clear of the push pin 58 when a rise of the elevator 11 makes the bell crank lever 87 push the bolt 57 to the front.

The alternative means illustrated in Figs. 14, 14ᵃ and 15, provide for locking the quadding jaw 17 in its normal position, unlocking it therefrom, moving it into quadding position, returning it to its normal position, putting the quadder into and out of action, and quadding a series of short lines. They are as follows, taking them in the above stated order of their respective purposes. 91 is a casing fixed upon the vise top 15 above the normal position of the jaw 17. 92 is a slide capable of vertical movement only, but in both directions, in antifriction guides 93 within the casing 91. 94 is a cord fast to the bottom of the casing 91 at 95, whence it is led upward over a pulley 96 on the slide 92, downward and under a pulley 97 on the casing 91 near the bottom of it, to the right and downward over pulleys 98, 99, on the vise top 15 and, finally, to a point 100 on the jaw 17 where it is made fast. 101 is a rack fast to the slide 92. It is shown as on the front of the casing 91, the connection between the two working in a slot 102 in the casing. 103 is a longer rack capable of a horizontal movement only in suitable guides 104, 104, on the casing 91, to be either in engagement with the rack 101 and consequently with the slide 92, or to the left of the rack 101 and out of engagement therewith. 105 is a link from the rack 103 to the top end of a lever 106 fulcrumed on a pin 107 supported by the casing 91 near the bottom of it. 108 is a spring pulling on the lever 106 from a fixed point on the casing 91 to keep the rack 103 engaged with the rack 101. Thus, it is the spring 108 that holds the jaw 17 locked in its normal position. 109 is a bell crank lever likewise fulcrumed on the pin 107 but independently of the lever 106. 110 is a spring adapted to hold this lever 109 in the dotted line position shown in Fig. 14. The lever 109 is turned down to the left by the operator when the jaw 17 is to be unlocked preparatory to quadding, and latched in that position by a catch 111 pivoted on a stud 112 and engaging over a pin 113 projecting to the front from the said lever 109. The latter, together with the link 105 and lever 106, are so proportioned and positioned that when the lever 109 is so turned down, its right arm is in engagement with a stud 114 on the lever 106, while the opposite arm projects into the downward path of a lug 115 so positioned on the adjacent side of the elevator 11 that it will engage and depress the said opposite arm far enough, acting through stud 114, lever 106 and link 105, to disengage the rack 103 from the slide 92 just before the said elevator has reached its lowest position. Thus it is the downward movement of the elevator 11 that unlocks the jaw 17. This jaw is then moved into the quadding position by a weight 116 dropping freely on the left side of the elevator 11, and connected to the said jaw by a cord 117 passed over a pulley 118 on the vise frame 12. The weight may be connected to the elevator 11 by the lug and groove device 54, 55 shown in Fig. 6. The jaw 17 is returned by the following combination. 119 is a bar mounted in the slide 92 so as to slide horizontally therein in both directions. 120 is a pin passed through the bar 119 and to which it is fast, and also through a slot 121 in the slide 92, the length of the slot being proportioned to the horizontal movements of the said bar. Each end of the pin 120 carries a roller 122 which engages in the respective track 123 in the casing 91. 124, 124, are inclines fast to the respective side of the casing 91 and facing the respective roller 122. The tops of these inclines project toward the respective tracks 123 far enough to hold the bar 119 practically within the casing 91. 125 is a spring resilient between the slide 92 and the bar 119 to keep its rollers 122, 122, up to the respective inclines 124, 124, so that as the bar 119 is carried downward by the downward movement of the slide 92, described farther on, the spring 125 gradually projects the nose of the bar 119 through a slot in the casing 91, far enough for it to be engaged by a lug 126 properly positioned on the elevator 11 to so engage it as the said elevator rises vertically to deliver the line 19 in it to the distributing apparatus.

When the jaw 17 had reached the quadding position, it had pulled the slide 92 downward until the bar 119 was at the level, and the spring 125 had protruded it as far as shown by the dot and dash line in Fig. 14. As the elevator 11 had reached its lowest position at about the time the jaw 17 had reached its quadding position, the lug 126 is in its lowest position before the bar 119 is protruded. Consequently, the rise of the elevator 11, first, takes the lug 115 off the lever 109, thereby allowing the spring 108 to pull on the rack 103, and then makes the lug 126 raise the bar 119, the inclines 124, 124, pushing it inward against the resilience of its spring 125, as it is being raised, until it is clear of the lug 126. The rise of the bar 119 carried the slide 92 up with it, thereby, through the cord 94, returning the jaw 17 to its normal position, where it is once more locked by the spring 108, rack 103 and their connections. Thus it is the rising top of the elevator 11 that returns the jaw 17, and as one end of the cord 94 is fast and the pulley 96 works in a bight of it, the jaw 17 moves two inches for each inch that the slide 92 moves. The slide 92 is suspended from a cord 127 made fast to the top of it at the point 128, led over a pulley 129 supported by the casing 91 above the slide 92 when it is in its highest position, and then downward to a spring drum 130 to the periphery of which it is made fast. The axis 131 of this drum is supported in the casing 91 and its spring 132 is always turning the drum to pull the slide 92 upward.

When there is only a single line 19 to be quadded, the operator puts the quadder into action by turning the lever 109 down to the left and engaging the catch 111 with its pin 113. The quadder is put out of action automatically as soon as the lug 115 has disengaged the pin 113 from the catch 111, for then the weight of the latter lays it down on its back upon the vise top 15 and the spring 110 returns the lever 109 to its normal position. But when there is a series of such lines to be quadded, the catch 111 must be kept up in its operative position in order that when the lug 115 leaves the lever 109, the latter may be reëngaged with the said catch by the spring 110. The pivot 112 and pin 113 are therefore long enough for the catch 111 to have two positions, one behind the other, and in either of which, engagement with the pin 113 is practicable. There is a block 133 standing up from the vise top 15 immediately to the right of, preferably, the rear one of the said two positions. So, the operator, to put the quadder in action for the said series, turns the lever 109 down and the catch 111 up as before and after he has engaged the said catch with the pin 113, he pushes it to the rear to the left of the block 133 which backs it up against the tendency of its own weight to disengage it from the pin 113. When the last line of the series has been quadded, the operator moves the catch 111 clear of the block 133 and the quadder is put out of action in the way previously described.

The alternative means above described do not dispense with the pawls 63, 64, 65, and their connections before described for locking the jaw 17 in its quadding position against the strain of the justification of the line.

The rack 44 has been described as being either on the jaw 17 or on a bar 45 fast to it. The bar 45 is fast to the jaw as far as the action of the improved quadder is concerned, but it is desirable that the short motion mentioned as required of the jaw 17 in coöperation with the pump stop should not be interfered with by the said quadder. Accordingly the jaw 17 is connected to the bar 45 as shown in Fig. 16, by shouldered screws 134 passed through the bar 45 or through a lug 135 on it, the lodes 136 in the bar 45 or lug 135 (as the case may be) being elongated enough to allow of the jaw 17 making the said short motion after it has been returned to its normal position. The jaw 17 being locked in this position, the weight 116 does not pull the said jaw up to a normal line during the time it is being justified. The same short motion on the part of the jaw 17 is provided for when the jaw is moved by the means shown in Figs. 14, 14ᵃ and 15, by attaching the end of the cord 94 to a bar connected to the jaw in the way just described.

According to a modification shown in Fig. 16, the pawl 46 is disengaged from the rack 44 by the bolt 57 engaging the underlying end of a bell crank lever 137 fulcrumed on the front of the block 78 already described, the opposite arm of the lever 137 being connected by a link 138 to the right hand end of the pawl 46 which accordingly has its pivot 139 to the left of the point of connection with the said link. The spring 140 to keep the pawl 46 engaged with the rack 44 is seated in a hole in the vise top 15 and presses the above-mentioned underlying end of the lever 137 upward.

The same figure shows a modification of the connection between the weight 48 and the jaw 17 shown in Figs. 6 and 7 and described therewith. According to this modification the cord 49 is replaced by a chain 141 fastened by its respective ends to the top and bottom of the weight 48 after having been led under the pulley 53—Fig. 7—and over a chain wheel 142 axially fast to the first of a train of three gear wheels 143, 144, 145, the last one engaging with a rack 146 on the bar 45. The weight 48 pulls the jaw 17 into quadding position as soon as the pawl 46 is disengaged from the rack 44. It is raised to reverse the train of gears 143 to 145 and the rack 146 to return the said jaw into its normal position, by the arm 75 already described.

We claim:—

1. The combination with the assembler elevator, line-assembling means, line resistant, and two finger line-shifter of a typographical composing machine; of means for holding one finger of the line shifter at a distance from its fellow finger equal to the full measure length of the line; means for making the assembler elevator present the line assembled in it, to the line shifter; means controlled by the assembler elevator for disengaging the said holding means from the respective finger of the line shifter; means operative when said disengaging of said holding means takes place to move the last mentioned finger toward the adjacent element of the assembled line; a yielding curved bar fast by its bottom end to this movable finger and so arranged as to present a convex gripping face into the path of the said adjacent element before the latter has cleared the line resistant.

2. The combination with the assembler elevator of a typographical composing machine, line assembling means, line resistant, two-finger line shifter, means for holding the relatively movable one of the line-shifter fingers at full measure distance from the other finger and means controlled by the assembler-elevator for moving the said relatively movable finger toward the other finger, of a reversely curved spring bar carried by the movable finger and so arranged as to present a convex face at its free end toward the other finger.

3. The combination with the assembler elevator of a typographical composing machine, line resistant, two-finger line shifter, means for holding the relatively movable line shifter fingers at full measure distance from the other finger, and means controlled by the assembler elevator for moving the relatively movable finger toward the other finger, of a flamboyantly curved spring bar connected at its lower end with the said movable finger and so arranged as to present a convex gripping face into the path of the assembled line before the latter has risen clear of the line resistant.

4. The combination in the quadding apparatus of a typographical composing machine, of a mold slot; a vise comprising a relatively stationary jaw and a relatively movable or quadding jaw, the latter being long enough to close metal tight the whole of the mold slot when it has been moved up to the stationary jaw; locking means normally holding said quadding jaw against quadding movement; automatic means for releasing said locking means upon the descent of the first elevator, and means operating automatically upon the release of said locking means for moving the quadding jaw up to the stationary jaw.

5. The combination in the quadding apparatus of a typographical composing machine, of a mold slot; a vise comprising a relatively stationary jaw and a relatively movable or quadding jaw, the latter being long enough to close metal tight the whole of the mold slot when it has been moved up to the stationary jaw; locking means normally holding said quadding jaw against quadding movement; releasing means for said locking means adapted at will to be rendered operative by the descent of the first elevator; means under the control of the operator and operatively connected with said releasing means for placing the latter within, or out of, the influence of said elevator; and means operating upon the release of said locking means for moving the quadding jaw up to the stationary jaw.

6. The combination in the quadding apparatus of a typographical composing machine, of a mold slot; a vise comprising a relatively stationary jaw and a relatively movable or quadding jaw, the latter being long enough to close metal tight the whole of the mold slot when it has been moved up to the stationary jaw; locking means normally holding said quadding jaw against locking movement; releasing means for said locking means adapted, at will, to be rendered operative by the descent of the first elevator; means, under the control of the operator, operatively connected with said releasing means, and adjustable to any one of a plurality of positions in order to place the releasing means within the influence of said elevator either for a single descent thereof, or for a series of said descents, or to place said means entirely out of the influence of the first elevator.

7. The combination with a quadding apparatus of a typographical composing machine having a line-holding vise comprising a relatively stationary jaw and a relatively movable or quadding jaw, a reciprocating member to place the line to be quadded in the vise and to take it out thereof, means consisting of a rack and a pawl engaged therewith for locking the quadding jaw in normal position and means for moving the said jaw out of normal into quadding position, of a push pin mounted parallel with the motion of the reciprocating member and in operative connection with the pawl; a bolt carried by the reciprocating member, capable of either of two positions and adapted when in one position to engage the push pin and make it disengage the pawl from its rack and when in the opposite position to miss the push pin when the reciprocating member is placing the assembled line in the vise; and means under the manual control of the operator for either projecting the said bolt from its socket or for locking it within its socket.

8. The combination in the quadding apparatus of a typographical composing machine having a line-holding vise comprising a relatively stationary and a relatively movable or quadding jaw as well as a reciprocating member adapted to place the line to be quadded between the said jaws and to take it from between them, of means for moving the quadding jaw out of the normal into the quadding position and of returning it thereinto, consisting of a weight; a flexible connection having the weight fast to it and the quadding jaw operatively connected to it; a pulley turning on an axis independent of both the weight and jaw, positioned to one side of the jaw and above the weight and over which the cord is led; and an arm on the said reciprocating member adapted by its movement, in one direction to allow the weight to drop and pull the quadding jaw into quadding position and by its movement in the opposite direction to lift the weight to return the said jaw into its normal position.

9. The combination in the quadding apparatus of a typographical composing machine having a line-holding vise comprising a relatively stationary and a relatively movable or quadding jaw as well as a reciprocating member adapted to place the line to be quadded between the said jaws and to take it from between them, of means for moving the quadding jaw out of its normal into its quadding position and of returning it thereinto, consisting of a practically endless cord operatively connected to the said jaw; a weight fixed at a suitable point in the length of the cord for its drop to pull the said jaw out of its normal into its quadding position; and an arm carried by the vertically reciprocating member under the weight, adapted when it rises to engage and lift the weight, to return the jaw.

10. The combination in the quadding apparatus of a typographical composing machine having a line-holding vise comprising a relatively stationary and a relatively movable or quadding jaw as well as a reciprocating member adapted to place the line to be quadded between the said jaws and to take it from between them, of means for moving the quadding jaw out of normal into quadding position and of returning it thereinto, consisting of a practically endless cord fast to the quadding jaw; a weight fixed at a suitable point in the length of the cord for its drop to pull the said jaw out of its normal into its quadding position; and a rising and falling arm under the weight, adapted when it rises to engage and lift the weight, the cord having two bights one around a pulley on an axis stationary on the side of the said jaw opposite to the weight and the other around a pulley on the arm, the arrangement being such that the drop of the weight pulls the jaw as the arm moves down to pay out cord and the arm rises to reverse the cord, reverse the jaw and lift the weight.

11. The combination in the quadding apparatus of a typographical composing machine having a mold carrier on a slide capable of being drawn to the front and a vise frame pivoted to the frame of the machine in front of the mold carrier so that it can be turned down to give access to the said slide, of a vise top fast on the top of the vise frame; a line-holding vise carried by the vise top and comprising a relatively stationary jaw and a relatively movable or quadding jaw; a rack incorporated with the quadding jaw; a pivot on said vise top; pawls on said pivot adapted to engage said rack; and means on said vise top for maintaining said pawls in engagement with said rack in the upturned position of said vise frame.

12. The combination in the quadding apparatus of a typographical composing machine having a mold carrier on a slide capable of being drawn to the front and a vise frame pivoted to the frame of the machine in front of the mold carrier so that it can be turned down to give access to the said slide, of a vise top fast to the top of the vise frame; a line-holding vise carried by the vise top and comprising a relatively stationary jaw and a relatively movable or quadding jaw; a horizontally slotted hole in the quadding jaw; a pivot on said vise top projecting through said hole; a rack incorporated with the quadding jaw; pawls on said pivot adapted to engage said rack; and means on said vise top for maintaining said pawls in engagement with said rack in the up-turned position of said vise frame.

13. The combination in the quadding apparatus of a typographical composing machine having a line-holding vise comprising a relatively stationary jaw and a relatively movable or quadding jaw, a reciprocating member to place the line to be quadded in the vise and to take it out thereof; means consisting of a rack and a pawl engaged therewith for locking the quadding jaw in normal position and means for moving the said jaw out of normal into quadding position, of a push pin mounted parallel with the motion of the reciprocating member and in operative connection with the said pawl; a bolt carried by the reciprocating member, capable of either of two positions and adapted when in one position to engage the push pin and make it disengage the pawl from its rack and when in the opposite position to miss the push pin when the reciprocating member is placing the assembled line in the vise; means under the manual control of the operator for holding the bolt clear of the push pin and automatic means for forcing it clear of the same.

14. The combination with the quadding apparatus of a typographical composing machine, of a device for controlling the means that locks the quadding jaw in normal position, consisting of a push pin in operative connection with the said means; bolt capable of being automatically put in position to engage the push pin; lever adapted by engagement with a relatively fixed part of the machine, to put the bolt out of the said position; and a manually controlled gravity latch adapted, according to its position, to automatically prevent the bolt engaging the push pin and to leave it free to engage the said pin.

In witness whereof the said CHARLES SHOWLER WOODROFFE has set his hand in the presence of two witnesses.

CHARLES SHOWLER WOODROFFE.

Witnesses:
 WALTER J. SKERTEN,
 G. F. WARREN.

In witness whereof the said HERBERT PEARCE and JOHN ERNEST BILLINGTON have set their hands in the presence of two witnesses.

HERBERT PEARCE.
   JOHN ERNEST BILLINGTON.

Witnesses:
 T. M. BUTT,
 GEO. DAVISON.